(12) United States Patent
Höfig

(10) Patent No.: US 11,594,136 B2
(45) Date of Patent: Feb. 28, 2023

(54) METHOD FOR PROVIDING A SAFE OPERATION OF SUBSYSTEMS WITHIN A SAFETY CRITICAL SYSTEM

(71) Applicant: Siemens Aktiengesellschaft, Munich (DE)

(72) Inventor: Kai Höfig, Munich (DE)

(73) Assignee: SIEMENS MOBILITY GMBH, Bayern (DE)

( * ) Notice: Subject to any disclaimer, the term of this patent is extended or adjusted under 35 U.S.C. 154(b) by 424 days.

(21) Appl. No.: 16/636,353

(22) PCT Filed: Jun. 18, 2018

(86) PCT No.: PCT/EP2018/066060
§ 371 (c)(1),
(2) Date: Feb. 4, 2020

(87) PCT Pub. No.: WO2019/029877
PCT Pub. Date: Feb. 14, 2019

(65) Prior Publication Data
US 2020/0166933 A1 May 28, 2020

(30) Foreign Application Priority Data
Aug. 11, 2017 (EP) .................................. 17185954

(51) Int. Cl.
*G08G 1/16* (2006.01)
*H04L 9/08* (2006.01)
(Continued)

(52) U.S. Cl.
CPC ............ *G08G 1/162* (2013.01); *G07C 5/008* (2013.01); *G07C 5/0816* (2013.01); *H04L 9/0819* (2013.01)

(58) Field of Classification Search
CPC combination set(s) only.
See application file for complete search history.

(56) References Cited

U.S. PATENT DOCUMENTS

| 2011/0083011 A1 | 4/2011 | Dicrescenzo |
| 2014/0189814 A1* | 7/2014 | Marten .................. G08G 1/205 726/4 |

(Continued)

FOREIGN PATENT DOCUMENTS

WO WO-2017005133 A1 * 1/2017 ............ H04W 12/04

OTHER PUBLICATIONS

"Vehicle-to-Vehicle Communications: Readiness of V2V Technology for Application", U.S. Department of Transportation, National Highway Traffic Safety Administration, Aug. 2014 (Year: 2014).*
(Continued)

*Primary Examiner* — Anne Marie Antonucci
*Assistant Examiner* — Amelia Vorce
(74) *Attorney, Agent, or Firm* — Schmeiser, Olsen & Watts LLP

(57) ABSTRACT

Provided is a method for providing a safe operation of subsystems within a safety critical system (SCS). A malfunctioning subsystem of the SCS sends a malfunction signal to the other subsystems of the SCS including a one-time cryptographic key unique to the malfunctioning subsystem, which is then decrypted by the other subsystems and collective safety management is initiated when the cryptographic key is valid. Also provided are traffic control systems, autonomous driving systems or automotive driver assistance systems. A swarm-like behavior of the subsystems collectively reacting to emergency situations is combined with a one-time cryptographic authentication and/or authorization procedure preventing repeated manipulation of the system by the same perpetrator.

15 Claims, 1 Drawing Sheet

Figure 1:
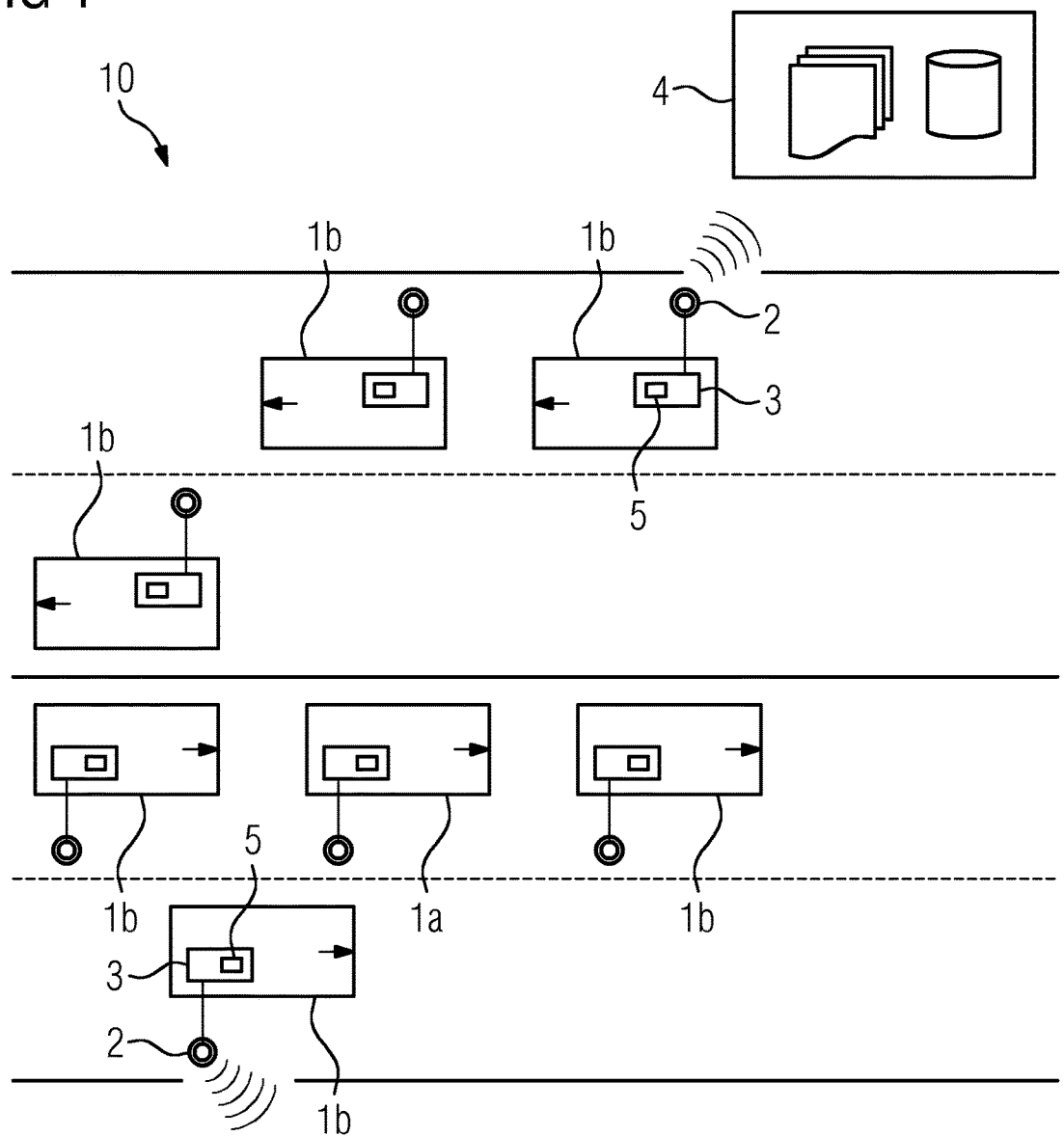

(51) Int. Cl.
*G07C 5/00* (2006.01)
*G07C 5/08* (2006.01)

(56) References Cited

U.S. PATENT DOCUMENTS

| | | | |
|---|---|---|---|
| 2014/0200760 A1* | 7/2014 | Kaufmann | G08G 1/162 |
| | | | 701/29.3 |
| 2014/0289512 A1 | 9/2014 | Tseng et al. | |
| 2016/0373449 A1 | 12/2016 | Haga et al. | |
| 2017/0018182 A1* | 1/2017 | Makled | G08G 1/096741 |
| 2017/0344023 A1* | 11/2017 | Laubinger | G08G 1/22 |
| 2017/0365105 A1* | 12/2017 | Rao | G07C 5/006 |
| 2018/0047293 A1* | 2/2018 | Dudar | G08G 1/22 |
| 2018/0082591 A1* | 3/2018 | Pandy | G07C 5/0808 |
| 2018/0144640 A1* | 5/2018 | Price | B60W 10/10 |

OTHER PUBLICATIONS

Maxim Raya et al: "Certificate Revocation in Vehicular Networks", XP055047092, Retrieved from the Internet: URL:http://infoscience.epfl.ch/record/83626/files/CertRevVANET.pdf?version-1; 2006.

"IEEE Standard for Wireless Access in Vehicular Environments—Security Services for Applications and Management Messages; IEEE Std 1609.2-2016 (Revision of IEEE Std 1609.2-2013)", IEEE Standard, IEEE, Piscataway, NJ, USA, pp. 1-240, XP068I06437, ISBN: 978-1-5044-0767-0 * Section 5 *; 2016.

PCT International Search Report and Written Opinion of International Searching Authority dated Jul. 30, 2018 corresponding to PCT International Application No. PCT/EP2018/066060, filed Jun. 18, 2018.

\* cited by examiner

METHOD FOR PROVIDING A SAFE OPERATION OF SUBSYSTEMS WITHIN A SAFETY CRITICAL SYSTEM

CROSS-REFERENCE TO RELATED APPLICATIONS

This application claims priority to PCT Application No. PCT/EP2018/066060, having a filing date of Jun. 18, 2018, which is based on European Application No. 17185954.9, having a filing date of Aug. 11, 2017, the entire contents both of which are hereby incorporated by reference.

FIELD OF TECHNOLOGY

The following pertains generally to a method for providing a safe operation of subsystems within a safety critical system and a corresponding safety critical system. The following relates particularly to providing safe operation within a cyber-physical system. The various systems, methods, and apparatuses described herein may be applied to, for example, traffic control systems, autonomous driving systems or automotive driver assistance systems. However, the present concepts are not limited to these applications and may be applied to intelligent power distribution networks, highly reliable healthcare systems, industrial automation and process steering systems, sustainable environmental systems, military networked systems or infrastructure and communication systems and so on.

BACKGROUND

A conventional system may comprise a plurality of different system components and/or subsystems. These subsystems may comprise software and/or hardware components. Components in a subsystem may comprise functional components providing functions which can be activated by other components of the same or another subsystem. A system, in particular a safety critical system, may comprise embedded subsystems that communicate with each other and build up a larger, loosely coupled system comprising an unknown configuration at runtime. Such a loosely coupled system is often referred to as a cyber-physical system.

A cyber-physical system can be for instance an intelligent transportation system comprising a plurality of autonomous vehicles, e.g. automobiles or other road vehicles, each being equipped with transmitting-receiving units to interact with each other. These kinds of systems can become safety critical due to associated risks during operation. For example, one vehicle may suffer a partial or complete failure. In such a case, the vehicle cannot just simply stop working, e.g. by initiating an emergency stop, because this might affect other vehicles of the system. A safe management of the situation is required that takes into account all other vehicles being potentially affected by the malfunctioning vehicle.

Moreover, in a complex safety critical system, it has to be decided whether or not it is safe for a part or subsystem of such a safety critical system to interoperate with another part or subsystem at runtime of the safety critical system. This has to be decided even when the parts or subsystems of the safety critical system are supplied by different vendors and therefore their interaction becomes a matter of trust between the vendors. For example, autonomous vehicles may have to be protected against intentional and/or unintentional adverse influence that could potentially affect the safety management of the vehicles.

Document US 2016/0373449 A1 provides a method for handling the case of detecting unauthorized frames transmitted over onboard networks.

Document Maxim Raya et al., "Certificate Revocation in Vehicular Networks," Dec. 31, 2006, discloses a set of protocols for efficient and effective revocation of certificates in vehicular networks to evict illegitimate or faulty network nodes.

SUMMARY

An aspect relates to economical solutions for providing a safe operation of a subsystem within a safety critical system comprising a plurality of subsystems interoperating with each other.

According to a first aspect of embodiments of the invention, a method for providing a safe operation of subsystems within a safety critical system (SCS) is provided. The method comprises assessing a malfunction within a malfunctioning subsystem among the subsystems of the SCS. The method further comprises sending, by the malfunctioning subsystem of the SCS, a malfunction signal via a communication unit of the malfunctioning subsystem to communication units of the other subsystems among the subsystems of the SCS, wherein the malfunction signal includes a cryptographic key being unique to the malfunctioning subsystem. The method further comprises decrypting, by a control unit of each of the other subsystems of the SCS, the cryptographic key of the malfunction signal. The method further comprises initiating collective safety management of the malfunctioning subsystem and the other subsystems when the decrypted cryptographic key is valid. The method further comprises communicating to the subsystems of the SCS that the cryptographic key of the malfunctioning subsystem is expired.

According to a second aspect of embodiments of the invention, a safety critical system (SCS) is provided. The SCS comprises subsystems. Each subsystem is equipped with an integrated identifier memory storing a cryptographic key unique to that subsystem. Each subsystem is further equipped with a communication unit being configured to facilitate communication with the other subsystems. Each subsystem is further equipped with a control unit being configured to assess a malfunction of the subsystem and to send a malfunction signal via the communication unit to the communication units of the other subsystems, the malfunction signal including the cryptographic key, and to decrypt a cryptographic key of a malfunctioning signal being communicated by one of the other subsystems, to initiate joined safety management of the subsystems when the decrypted cryptographic key is valid and to communicate to the subsystems that the cryptographic key of the malfunctioning subsystem is expired.

One idea of embodiments of the present invention is to implement a very simple yet effective safety management function in a safety critical system, in particular a cyber-physical system, by combining a form of collective or swarm behavior of the individual subsystems with encryption functionality. To this end, the individual subsystems are each provided with a communication unit, which in principle can be any kind of transmitting-receiving device, in particular based on wireless data transmission technologies. When one of the subsystems detects a safety critical fault or malfunction that requires immediate corrective action, this particular subsystem is able to send a corresponding malfunction signal to the other subsystems, which then can react in an appropriate way. As the subsystems are able to constantly communicate with each other, counter measures can be performed in a collective way, i.e. in the form of a collective safety management. In this way, the actors, i.e. the subsystems, can react in such a way that there is no danger to any participant of the system due to the malfunction of one participant. In addition, the safety management function is secured against any form of intentional and/or unintentional repeated manipulation of the system by means of a cryptographic key being included in the malfunction signal. Collective safety management is only initiated when the cryptographic key of the malfunction signal, which is unique to each subsystem, is valid and can be encrypted by the other subsystems. The cryptographic key may be any form of (digital) key known to the person of skill and being suitable for the present application, e.g. asymmetric or symmetric keys or a combination of both, one-time authentication and/or authorization keys, etc. As soon as collective safety management is initiated, the utilized cryptographic key expires (which can be communicated to the other subsystems or to a central authority within or without the SCS), and thus a single cryptographic key cannot be used repeatedly, that is more than once. The respective malfunctioning subsystem then has to acquire a new cryptographic key from a trusted authority, e.g. via a secure line or via maintenance service after collective safety management is terminated. In this way, protection against multiple abuses is provided in a very simple yet highly effective way. Isolated or singular, accidental or erroneous malfunction signals are thus knowingly accepted in order to keep the system as simple as possible.

To summarize, an innovation of embodiments of the present invention can be seen in the fact that an adequate encryption is combined with a collective functionality to provide safe operation of a safety critical system in an efficient way such that expenditures, e.g. for redundancy functionalities or the like, may be reduced or minimized or at least mitigated.

Advantageous embodiments and improvements of the present invention are found in the subordinate claims.

According to an embodiment of the method, a unique cryptographic key may be allocated to each subsystem of the SCS.

The SCS may comprise a safety cloud backend being configured to allocate the unique cryptographic key to each subsystem of the SCS. Correspondingly, according to an embodiment of the method, the unique cryptographic key may be allocated to each subsystem of the SCS via the safety cloud backend of the SCS. The safety cloud backend may be adapted and/or authorized to communicate with vendor servers or the like of vendors of the subsystems. To this end, the SCS may comprise a wireless or a wired interface with a safety cloud backend comprising at least one safety cloud server.

According to an embodiment of the method, the expiration of the cryptographic key of the malfunctioning subsystem may be communicated to the safety cloud backend of the SCS. For this, each control unit may be configured to communicate the expiration of the cryptographic key to the safety cloud backend.

The method may further comprise allocating, by the safety cloud backend, a new cryptographic key to the malfunctioning subsystem after the joined safety management has been terminated. Accordingly, the safety cloud backend may be configured to allocate a new cryptographic key to the malfunctioning subsystem after the joined safety management has been terminated.

According to an embodiment of the invention, the joined safety management may comprise an emergency stop of the malfunctioning subsystem. For this, each control unit may be configured to initiate an emergency stop of the corresponding subsystem when a malfunction of this subsystem is assessed and joined safety management is initiated.

According to an embodiment of the invention, the SCS may be a transportation system comprising autonomous vehicles, the autonomous vehicles constituting the subsystems of the SCS. In that case, joined safety management may comprise an emergency stop of the malfunctioning vehicle.

The joined safety management may comprise collectively adapting individual movements of the subsystems. For this, the control units of the subsystems may be configured to collectively adapt individual movements of the subsystems within the joined safety management. Thus, the malfunctioning vehicle may be stopped while the other vehicles, in particular the vehicles in the immediate vicinity of the malfunctioning vehicle, may throttle their respective speeds in an appropriate way, may also perform emergency stops and/or may initiate any other counter measure suitable, e.g. evasive maneuvers etc.

BRIEF DESCRIPTION

Figure 2:
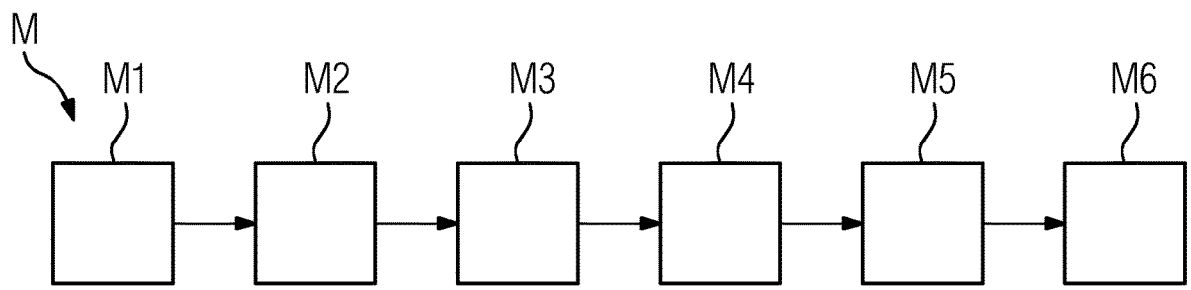

Some of the embodiments will be described in detail, with reference to the following figures, wherein like designations denote like members, wherein:

FIG. 1 schematically shows a safety critical system (SCS) according to an embodiment of the invention; and FIG. 2 shows a schematic flow diagram of a method for providing a safe operation of a subsystem within the SCS of FIG. 1.

DETAILED DESCRIPTION

Although specific embodiments are illustrated and described herein, it will be appreciated by those of ordinary skill in the art that a variety of alternate and/or equivalent implementations may be substituted for the specific embodiments shown and described without departing from the scope of embodiments of the present invention. Generally, this application is intended to cover any adaptations or variations of the specific embodiments discussed herein.

FIG. 1 schematically shows a safety critical system (SCS) 10 according to an embodiment of the invention. FIG. 2 shows a schematic flow diagram of a method M for providing a safe operation of a plurality of subsystems 1a, 1b within the SCS 10 of FIG. 1. Purely for illustration purposes, the embodiment of the SCS 10 discussed with reference to FIG. 1 is a system of autonomous vehicles, e.g. cars or similar. However, the person of skill will be readily aware that many other applications of the present teachings are possible including but not limited to traffic control systems, automotive driver assistance systems, intelligent power distribution networks, highly reliable healthcare systems, industrial automation and process steering systems, sustainable environmental systems, military networked systems or infrastructure and communication systems and so on.

FIG. 1 shows a four-lane street, on which a plurality of subsystems 1a, 1b, i.e. vehicles, are moving in different directions (cf. the arrows indicating the direction of movement). The subsystems 1a, 1b are autonomous participants of a SCS 10. Each subsystem 1a, 1b is provided with an integrated identifier memory 5 configured to store a cryptographic key unique to that subsystem 1a, 1b (for reasons of clarity only some exemplary subsystems 1a, 1b are provided with reference signs, however, the basic setup of all shown subsystems 1a, 1b, is similar or identical). Each subsystem 1a, 1b further includes a communication unit 2 configured to facilitate communication with the other subsystems 1a, 1b. Each communication unit 2 may be any kind of transmitting-receiving device, e.g. a device for wireless data transmission. In addition, each subsystem 1a, 1b comprises a control unit 3 configured to assess a malfunction of the corresponding subsystem 1a and to send a malfunction signal via the communication unit 2 to the communication units 2 of the other (working) subsystems 1b. In the particular example shown in FIG. 1, subsystem 1a has detected a fault (this step is indicated under M1 in FIG. 2), which requires it to stop. Thus, the subsystem 1a sends a malfunction signal to the other subsystems 1b via the communication unit 2 (indicated under M2 in FIG. 2). The malfunction signal includes the cryptographic key of that particular subsystem 1a. The control units 3 of the subsystems 1a, 1b are configured to decrypt the cryptographic key of the malfunctioning signal (the step of decrypting is indicated under M3 in FIG. 2). If the cryptographic key turns out to be valid, i.e. the authenticity and/or authority of the malfunctioning subsystem 1a is approved, then collective safety management of the subsystems 1a, 1b is initiated (indicated under M4 in FIG. 2).

Collective safety management of the subsystems 1a, 1b may particularly comprise initiating and executing an emergency break of the malfunctioning subsystem 1a. Correspondingly, in order not to endanger the other subsystems 1b, in particular the subsystems 1b positioned directly behind or next to the malfunctioning subsystem 1a, the collective safety management further includes appropriate adjustment of the velocities of the other subsystems 1b. For example, the subsystems 1b behind and nearby the malfunctioning subsystem 1a may equally initiate emergency breaks or at least drastically reduce their velocities, and/or possibly shift their driving directions in order to avoid a collision with the malfunctioning subsystem 1a. The subsystems 1b driving in opposite direction however are not affected and thus proceed without any changes. The person of skill will be readily aware that collective safety management according to embodiments of the invention may comprise various other safety measures useful for the individual application and the individual situation at hand.

Next, the cryptographic key of the malfunctioning subsystem 1a is set to expired, which is communicated to the subsystems 1a, 1b (indicated under M5 in FIG. 2). Thus, the cryptographic key is a one-time key such that it is not possible for the malfunctioning subsystem la to send another valid malfunction signal, i.e. to initiate another collective safety management, until the malfunctioning subsystems 1a has renewed its cryptographic key. The SCS 10 and the method M of operating it as described above feature a twofold advantage. On the one hand, a swarm-like behavior of the subsystems 1a, 1b is used to perform a safe emergency stop of the affected subsystems 1a, 1b that only involves the subsystems 1b affected by the malfunctioning subsystem 1a. On the other hand, the one-time cryptographic key ensures that the system cannot be manipulated or adversely affected repeatedly by the same subsystem 1a, 1b or perpetrator. Isolated and/or accidental erroneous emergency stops or other safety measures are knowingly accepted in order to reach an optimal compromise between effectiveness and simplicity. In order for the system and the method to be effective, it is sufficient for the individual subsystems 1a, 1b to be furnished with some kind of emergency stop functionality. Additional and more advanced functionalities are not necessarily required in order for the system to be effective.

The SCS 10 in FIG. 1 further comprises a safety cloud backend 4, which is configured to allocate a unique cryptographic key to each subsystem 1a, 1b of the SCS 10. The safety cloud backend 4 may be configured as some form of central trusted authority and thus may further be configured to allocate a new cryptographic key to the malfunctioning subsystem 1a after the joined safety management has been terminated (indicated under M6 in FIG. 2). To this end, the SCS 10 may comprise a wireless or a wired interface with the safety cloud backend 4, which in turn may comprise a safety cloud server and so on. Correspondingly, each control unit 3 may be configured to communicate the expiration of the cryptographic key to the safety cloud backend 4.

In the foregoing detailed description, various features are grouped together in one or more examples or examples with the purpose of streamlining the disclosure. It is to be understood that the above description is intended to be illustrative, and not restrictive. It is intended to cover all alternatives, modifications and equivalents. Many other examples will be apparent to one skilled in the art upon reviewing the above specification.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements. The mention of a "unit" or a "module" does not preclude the use of more than one unit or module.

The invention claimed is:

1. A method for providing a safe operation of subsystems within a safety critical system (SCS), the method comprising:
    assessing a malfunction within a malfunctioning subsystem among the subsystems of the SCS;
    sending, by the malfunctioning subsystem of the SCS, a malfunction signal via a communication unit of the malfunctioning subsystem to communication units of the other subsystems among the subsystems of the SCS, wherein the malfunction signal includes a cryptographic key being unique to the malfunctioning subsystem;
    decrypting, by a control unit of each of the other subsystems of the SCS, the cryptographic key of the malfunction signal;
    initiating collective safety management of the malfunctioning subsystem and the other subsystems when the decrypted cryptographic key is valid; and
    communicating to the subsystems of the SCS that the cryptographic key of the malfunctioning subsystem is expired due to the sending of the malfunction signal;
    wherein the cryptographic key is a one-time key such that it is not possible for the malfunctioning subsystem to send another valid malfunction signal to initiate another collective safety management until the malfunctioning subsystem receives a new cryptographic key.

2. The method according to claim 1, wherein a unique cryptographic key is allocated to each subsystem of the SCS.

3. The method according to claim 1, wherein the expiration of the cryptographic key of the malfunctioning subsystem is communicated to a safety cloud backend of the SCS.

4. The method according to claim 1, wherein a unique cryptographic key is allocated to each subsystem of the SCS via a safety cloud backend of the SCS.

5. The method according to claim 4, further comprising:
allocating, by the safety cloud backend, the new cryptographic key to the malfunctioning subsystem after the collective safety management has been terminated.

6. The method according to claim 5, wherein the collective safety management comprises an emergency stop of the malfunctioning subsystem.

7. The method according to claim 1, wherein the SCS is a transportation system comprising autonomous vehicles, the autonomous vehicles constituting the subsystems of the SCS.

8. The method according to claim 7, wherein the collective safety management comprises collectively adapting individual movements of the subsystems.

9. A safety critical system (SCS), comprising subsystems, each subsystem comprising:
- an integrated identifier memory storing a cryptographic key unique to that subsystem;
- a communication unit being configured to facilitate communication with the other subsystems; and
- a control unit being configured to:
  - assess a malfunction of the subsystem;
  - send a malfunction signal via the communication unit to communication units of the other subsystems, the malfunction signal including the cryptographic key;
  - decrypt a cryptographic key of a malfunctioning signal being communicated by one of the other subsystems;
  - initiate collective safety management of the subsystems when the decrypted cryptographic key is valid; and
  - communicate to the subsystems that the cryptographic key of the malfunctioning subsystem is expired due to sending of the malfunction signal;

wherein the cryptographic key is a one-time key such that it is not possible for the malfunctioning subsystem to send another valid malfunction signal to initiate another collective safety management until the malfunctioning subsystem receives a new cryptographic key.

10. The safety critical system according to claim 9, further comprising a safety cloud backend being configured to allocate the cryptographic key to each subsystem of the SCS.

11. The safety critical system according to claim 10, wherein each control unit is configured to communicate the expiration of the cryptographic key to the safety cloud backend.

12. The safety critical system according to claim 10, wherein the safety cloud backend is configured to allocate the new cryptographic key to the malfunctioning subsystem after the collective safety management has been terminated.

13. The safety critical system according to claim 9, wherein each control unit is configured to initiate an emergency stop of the corresponding subsystem when a malfunction of this subsystem is assessed and the collective safety management is initiated.

14. The safety critical system according to claim 9, wherein the SCS is a transportation system comprising autonomous vehicles, the autonomous vehicles constituting the subsystems of the SCS.

15. The safety critical system according to claim 14, wherein the control unit of the subsystems is configured to collectively adapt individual movements of the subsystems within the collective safety management.

\* \* \* \* \*